US012253239B2

(12) United States Patent
Burke

(10) Patent No.: US 12,253,239 B2
(45) Date of Patent: Mar. 18, 2025

(54) MODULE FOR INSTALLATION OF A LIGHTING UNIT IN A RECESS

(71) Applicant: SIGNIFY HOLDING B.V., Eindhoven (NL)

(72) Inventor: Oliver Francis Burke, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/697,790

(22) PCT Filed: Sep. 27, 2022

(86) PCT No.: PCT/EP2022/076780
§ 371 (c)(1),
(2) Date: Apr. 2, 2024

(87) PCT Pub. No.: WO2023/057256
PCT Pub. Date: Apr. 13, 2023

(65) Prior Publication Data
US 2024/0401783 A1 Dec. 5, 2024

(30) Foreign Application Priority Data
Oct. 5, 2021 (EP) .................................... 21200849

(51) Int. Cl.
*F21V 21/04* (2006.01)
*F21S 8/02* (2006.01)

(52) U.S. Cl.
CPC ............ *F21V 21/041* (2013.01); *F21S 8/026* (2013.01)

(58) Field of Classification Search
CPC ......................... F21V 21/04-049; F21S 8/026
See application file for complete search history.

(56) References Cited

U.S. PATENT DOCUMENTS

2018/0311833 A1 11/2018 Lipton et al.

FOREIGN PATENT DOCUMENTS

JP H09129025 A * 5/1997
JP 3700092 B2 9/2005
WO 2012035007 A1 3/2012

* cited by examiner

*Primary Examiner* — Sean P Gramling

(57) ABSTRACT

The invention provides a module for installation of a lighting unit in a recess, wherein the module comprises: a first body comprising a first collar; a second body comprising a second collar; at least one flexible strut; wherein the first body and/or the second body is configured to hold said lighting unit; wherein the first body and the second body are rotatable relative to each other around a rotation axis, and are positionally fixed relative to each other in the axial direction of said rotation axis; wherein the at least one flexible strut comprises a respective first end and a respective second end, wherein said first end is fixed to a respective first connection point on the first collar and said second end is fixed to a respective second connection point on the second collar; wherein the at least one flexible strut comprises a strut length, wherein the strut length is at least a factor 1.2 longer than the shortest distance between the respective first connection point and the second collar; wherein the at least one flexible strut is configured to deform in a direction away from the rotational axis when a rotation of the first body and the second body relative to each other reduces the distance between said first connection point and said second connection point. The invention further provides a lighting device comprising said lighting unit and said module.

15 Claims, 3 Drawing Sheets

MODULE FOR INSTALLATION OF A LIGHTING UNIT IN A RECESS

CROSS-REFERENCE TO PRIOR APPLICATIONS

This application is the U.S. National Phase application under 35 U.S.C. § 371 of International Application No. PCT/EP2022/076780, filed on Sep. 27, 2022, which claims the benefit of European Patent Application No. 21200849.4, filed on Oct. 5, 2021. These applications are hereby incorporated by reference herein.

FIELD OF THE INVENTION

The invention relates to a module for installation of a lighting unit in a recess. The invention further relates to a lighting device comprising said lighting unit and said module. The invention further relates to a method of installing a lighting unit in a recess, the method being performed by the module according to the invention.

BACKGROUND OF THE INVENTION

Recessed lighting devices are typically held in a recess, such as a hole in a ceiling, by means of spring fixation. Namely, lighting devices (or e.g.: luminaires) for installation in a recess typically comprise spring clips (e.g. torsion spring clips) at their circumference. These spring clips are pushed inwards by the fingers of an installer, when moving the lighting device into the recess. These spring clips are then automatically released, when the lighting device is positioned in the recess. This fixates the lighting device in the recess. Such a spring system is used for both smaller luminaires, such as e.g. the GUIO downlights, as well as for larger luminaires, such as e.g. the Downlight TT series of Signify.

A disadvantage of such a spring system is that it is laborious to hold a spring clip in place when installing a recessed lighting device: particularly as the spring clip itself (that is pushed with the fingers of the installer) moves into the recess as well. This is especially cumbersome for smaller size luminaires and associated spring and/or clip sizes. Furthermore, the removal of such recessed lighting devices from the recess generally requires a forceful pulling out action. Therefore, maintenance or replacement of such recessed lighting devices may not be ergonomic, and may often lead to damages to the recess and/or the lighting device itself.

Even further, springs clips may exert a high force on the area where the springs are attached to the lighting device, leading to higher local stresses and potential cracking, which is especially a problem for 3D-printed luminaires, to which the lighting industry is moving as well.

Hence, there exists a clear need for improving the installation recessed lighting devices, and providing alternatives for installing a lighting unit in a recess.

SUMMARY OF THE INVENTION

It is an object of the invention to provide an improved module for installation of a lighting unit in a recess, which at least alleviates the problems and disadvantages mentioned above, and renders a more efficient solution for installation. Thereto, the invention provides a module for installation of a lighting unit in a recess, wherein the module comprises: a first body comprising a first collar: a second body comprising a second collar; at least one flexible strut: wherein the first body and/or the second body is configured to hold said lighting unit: wherein the first body and the second body are rotatable relative to each other around a rotation axis, and are positionally fixed relative to each other in the axial direction of said rotation axis: wherein the at least one flexible strut comprises a respective first end and a respective second end, wherein said first end is fixed to a respective first connection point on the first collar and said second end is fixed to a respective second connection point on the second collar: wherein the at least one flexible strut comprises a strut length, wherein the strut length is at least a factor 1.2 longer than the shortest distance between the respective first connection point and the second collar: wherein the at least one flexible strut is configured to deform in a direction away from the rotational axis when a rotation of the first body and the second body relative to each other reduces the distance between said first connection point and said second connection point.

Said module comprises a first body, a second body, and at least one flexible strut. The first body and the second body are rotatable relative to each other around a rotation axis. The first body and the second body are also positionally fixed relative to each other in the axial direction of said rotation axis. Hence, the first body and the second body merely have, in an initial mode of operation, one degree of freedom relative to each other, which is the rotation relative to each other around the rotation axis. Said initial mode of operation may alternatively be phrased as an unlocked mode of operation.

Furthermore: The first body comprises a first collar. The second body comprises a second collar. The at least one flexible strut is an elongated structural element. The at least one strut may for example comprise an elongated central axis. The at least one flexible strut comprises a respective first end and, opposite thereto, a respective second end. Said first end and said second end may for example span said elongated central axis. Thereby, for each flexible strut of the at least one flexible strut, the respective first end is fixed to a respective first connection point on the first collar of the first body, and the respective second end is fixed to a respective second connection point on the second collar of the second body.

Moreover, the at least one flexible strut comprises a strut length. The strut length may be defined as the length between the respective first end and the respective second end. For example, the strut length may be defined along said elongated central axis, mentioned above. According to the present invention, the strut length of the at least one flexible strut is at least a factor 1.2 longer than the shortest distance between the respective first connection point and the second collar.

As a consequence of this, the at least one flexible strut will substantially lie in a circumferential plane spanned between the first collar and the second collar, when the distance between the first connection point and the second connection point equals the strut length of the at least one flexible strut. However, when the rotation of the first body and the second body relative to each other reduces the (shortest) distance between said first connection point and said second connection point, while the strut length of the at least one flexible strut remains substantially equal, the at least one flexible strut will deform in a direction away from the rotational axis. Hence, the at least one flexible strut may deform in a radial direction outwards. Said phrase ‘deform’ may alternatively be phrased as ‘deflect’, ‘shape’ or ‘expand’, throughout the application.

Thereby, a maximum deformation in radial direction outwards will occur at when the distance between the first point and the second point is at a minimum, i.e. when said distance equals the shortest distance between the first point and the second collar, or i.e. when a virtual line through the first point and the second point is parallel to the rotation axis.

Hence, because the rotation reducing the distance between the first connection point and the second connection point causes the at least one strut to deform in a direction away from the rotation axis, the at least one flexible strut may, when deformed, abuts a surface of a recess into which the module and the associated lighting unit is to be installed. Thereby, the at least one strut may exert a force to a surface of the recess, which holds the module fixed in said recess. In examples, said force may e.g. be a normal force on said surface.

Alternatively phrased, throughout the application, said at least one flexible strut may, when deformed, at least partially abuts a surface of the recess in which the module and the associated lighting unit is to be installed.

Thereby, it is noted that the lighting unit may for example be mounted to module after installation of the module in the recess, or that the lighting unit may already be part of the module when installing the module in the recess. According to the invention, the lighting unit and the module may be electrically connected and/or mechanically connected in operation.

Moreover, because the first body and/or the second body is configured to hold said lighting unit, the module according to the invention advantageously enables the installation of a lighting unit in a recess, by easily rotating the first body and the second body relative to each other when the module is positioned at least partly in the recess, and without the use of any cumbersome and unergonomic spring clips.

As mentioned, the first body and the second body are rotatable relative to each other around a rotation axis. Hence, according to the invention, the first body may be kept stationary and the second body may be rotated, or the first body may be rotated and the second body may be kept stationary, or the first body and the second body may be rotated simultaneously relative to each other. Such rotation of bodies relative to each other are commonly understood. An installer may e.g. keep one respective body stationary, while rotating the other respective body. This may alternatively be performed by pushing one body to a surface, such that said body is kept stationary, while the other body is rotated. For example, the second body may be pushed to a surface to keep it stationary, while the first body is rotation, or vice versa.

In aspects of the invention, the first body may comprise an aperture for accessing the first body. In aspects of the invention, the second body may be accessible through the first body. For example, the first body may comprise a first body aperture, such as e.g. a sleeve or a slit: wherein the second body may comprise a protrusion extending through, or accessible through, said first body aperture for accessing the second through the first body.

As partly mentioned, the first body and the second body are rotatable relative to each other around a rotation axis, in an initial mode of operation. In an embodiment, the module may comprise a locking mechanism configured to releasably fixate, in a locked mode of operation, the rotation of the second body relative to the first body.

Since the locking mechanism releasably fixates the rotation of the second body relative to the first body, the locking prevents the second body to rotate separately from to the first body, or vice versa, in said locked mode of operation. This renders that the distance between said first connection point and said second connection point also remains releasably fixated in said locked mode of operation, which keeps the deformation of the at least one flexible strut fixed, and thereby keeps the module fixated in the recess, when installed.

Even further, since the locking mechanism is configured to releasably fixate, in the locked mode of operation, the rotation of the second body relative to the first body, the locking mechanism is also able to release the module back into the initial mode of operation, in which the first body and the second body are rotatable relative to each other around the rotation axis. This advantageously allows the module to be removed from the recess as well, e.g. for purposes of maintenance or replacement, without requiring any force to pull out or affecting the recess itself.

In an embodiment, said locking mechanism may be configured to releasably fixate, in said locked mode of operation, the rotation of the second body relative to the first body when the distance between said first connection point and said second connection point equals the distance between the respective first connection point and the second collar. Hence, the rotation of the second body relative to the first body is releasably fixated, when the at least one strut is substantially at a maximum deformation in radial direction outwards. This ensures that the locked mode of operation may occur when the at least one strut most optimally abuts, and exerts a force, on a surface of the recess.

The locking mechanism may for example make use of magnets. Hence, in aspects, the locking mechanism may comprise a first magnet on the first body and a second magnet on the second body, wherein the second body is releasably locked to the first body when the first magnet aligns with the second magnet. Such magnets may allow the first body and the second body to have a respective flat surface facing each other, said flat surfaces comprising the respective magnets, while still allowing releasably locking without any clicking or fitting.

The locking mechanism may for example make use of a snap-fit connection. Hence, in aspects, the locking mechanism may comprise a protrusion on the first body and a slot on the second body, wherein the second body is releasably locked to the first body when the protrusion aligns with and snaps into the slot. Alternatively, the second body may comprise said protrusion, and the first body may comprise said slot.

In an embodiment, the at least one flexible strut may be configured to elastically deform in a direction away from the rotational axis when a rotation of the first body and the second body relative to each other reduces the distance between said first connection point and said second connection point. Said elastic deformation may allow, for example in combination with releasing said locking means from the locked mode of operation, that the at least one flexible strut may deform back into a previous shape, or fall back into the initial mode of operation when a rotation of the first body and the second body relative to each other increases the distance between said first connection point and said second connection point. Hence, the elastic deformation enables to easily re-use the module, more specifically to mount and demount said module in the recess. Moreover, the elastic deformation enables to deform the at least one flexible strut at will between various deformed states by rotation of the first body and the second body relative to each other.

In an alternative embodiment, the at least one flexible strut may be configured to plastically deform in a direction away from the rotational axis when a rotation of the first body and the second body relative to each other reduces the distance between said first connection point and said second connection point. Said plastic deformation may enable that the at least one flexible strut may maintain its deformed shape, e.g. due to strain hardening. Hence, a locking mechanism may not necessarily be required for flexible struts that deform plastically.

In an embodiment, the at least one flexible strut comprises a strut material, wherein the strut material comprises at least one of: a metal, a polymer, a composite fiber, a natural material. Said metal may for example comprise one of: copper, stainless steel, steel, iron. Said polymer may for example comprise at least one of: ABS, TPU, PE, PA, EVA. Said strut material may for example be Natural materials could also be used: rubber, leather, cork, wood. Said natural materials may e.g. be strengthened with said metal or polymer materials.

As mentioned, the at least one flexible strut is an elongated structural element. Hence, in an embodiment, the at least one flexible strut comprises a strut width, wherein the strut width is at most a fifth of the strut length. Said strut width may for example be defined in a direction perpendicular to the elongated central axis as mentioned before. Said strut width may thereby be defined substantially in a tangential direction relative to the rotation axis.

Similarly, in an embodiment, the at least one flexible strut comprises a strut thickness, wherein the strut thickness is at most equal to the strut width, or preferably at most a fifth of the strut width. Said strut thickness may for example be defined in a direction perpendicular to the elongated central axis as mentioned before. Said strut thickness may thereby be defined in a direction perpendicular to the plane spanned by the first end and the second end of the at least one flexible strut, and in a radial direction relative to the rotation axis.

In an embodiment, the first body and/or the second body comprises a hollow interior space arranged for holding said lighting unit. Hence, a lighting unit may be mounted, or installed, into said hollow interior space of the first body and/or the second body.

In an embodiment, the at least one flexible strut comprises a strut surface, wherein the strut surface comprises a patterned texture. Said patterned texture may increase the roughness of the strut surface, such that the at least one strut may, when deformed, about the a surface of a recess into which a lighting unit is to be installed with more friction. Hence, said strut surface may comprise a roughness. Said roughness may comprise an Ra value of at least 0.5 micrometer. Said strut surface may alternatively comprise an array of protrusions, for similarly improving the fixation of the module in the recess.

In an embodiment, the first collar and/or the second collar is circular, wherein the first collar and/or the second collar is circular comprises a diameter of at least 50 millimeter. Hence, the module according to the invention may be suitable for downlights.

Alternatively, said first collar and/or said second collar may be elliptical. Alternatively, said first collar and/or said second collar may be square or any other polygonal shape.

In an embodiment, the at least one flexible strut comprises a first strut and a second strut: wherein the first connection point associated with the first strut and the first connection point associated with the second strut are arranged antipodal to each other on the first collar: wherein the second connection point associated with the first strut and the second connection point associated with the second strut are arranged antipodal to each other on the second collar. Such an embodiment is advantageous, as only two flexible struts are required to hold the module in the recess.

In an embodiment, the at least one flexible strut comprises at least three flexible struts.

In an embodiment, the first body comprises an optical element for controlling light emitted by said lighting unit. In an embodiment, the second body is a downlight comprising said lighting unit, wherein the first body comprises a trim of a downlight. In an embodiment, said first body may comprise a trim of a downlight.

In an embodiment, the module according to the invention may comprise a power means for conveying power to the lighting unit, wherein the first body and/or the second body comprise a connector for connecting the lighting unit to the power means.

It is further an object of the invention to provide an improved lighting device, which at least alleviates the problems and disadvantages mentioned above. Thereto, the invention provides a lighting device comprising a lighting unit and the module according to the invention: wherein the module is configured to be fixated in a recess when, in operation, a rotation of the first body and the second body relative to each other reduces the distance between said first connection point and said second connection point and causes the at least one flexible strut to deform in a direction away from the rotational axis: wherein the at least one flexible strut, when deformed, abuts a surface of said recess: wherein the lighting unit is configured to be mounted to the first body and/or to the second body of the module. Thereby, advantages and/or embodiments applying to the module according to the invention may mutatis mutandis apply to said lighting device according to the invention.

According to the invention, the lighting unit and the module may be electrically connected and/or mechanically connected in operation.

In an embodiment, the first body and/or the second body of the module comprises the lighting unit. Hence, the lighting unit may be embedded in the first body and/or the second body. Moreover, in aspects, the first body and/or the second body may be the lighting unit itself. Hence, the invention may provide a lighting device with a module to install the lighting unit in a recess.

It is further an object of the invention to provide an improved method, which at least alleviates the problems and disadvantages mentioned above. Thereto, the invention provides a method of installing a lighting unit in a recess, the method being performed by the module according to any one of the preceding claims 1-12, wherein the method comprises: positioning the module in the recess: deform the at least one flexible strut of the module in a direction away from the rotational axis upon rotating the first body and the second body relative to each other to reduce the distance between said first connection point and said second connection point: wherein the module comprises a locking mechanism: wherein the method comprises: releasably fixate, in a locked mode of operation, with the locking mechanism, the rotation of the second body relative to the first body: wherein the at least one flexible strut, when deformed, abuts a surface of said recess for holding the module in the recess: wherein the first body and/or the second body is configured to hold said lighting unit. Thereby, advantages and/or embodiments applying to the module and/or lighting device according to the invention may mutatis mutandis apply to said method according to the invention In an embodiment, the method comprises: mounting the lighting unit to the first body and/or to the second body of the module.

BRIEF DESCRIPTION OF THE DRAWINGS

The invention will now be further elucidated by means of the schematic non-limiting drawings.

DETAILED DESCRIPTION OF THE EMBODIMENTS

Recessed lighting devices are typically held in a recess by means of spring fixation. Said recess may for example be a hole in a ceiling. As this known method of spring fixation may render disadvantages, as mentioned in the background section, there exists a clear need for improving the installation of recessed lighting devices, and providing alternatives for installing a lighting unit in a recess. The present invention addresses said disadvantages, and provides an improved module for installation of a lighting unit in a recess, an improved lighting device comprising said module and said lighting unit, and an improved method of installing a lighting unit in a recess.

Figure 1:
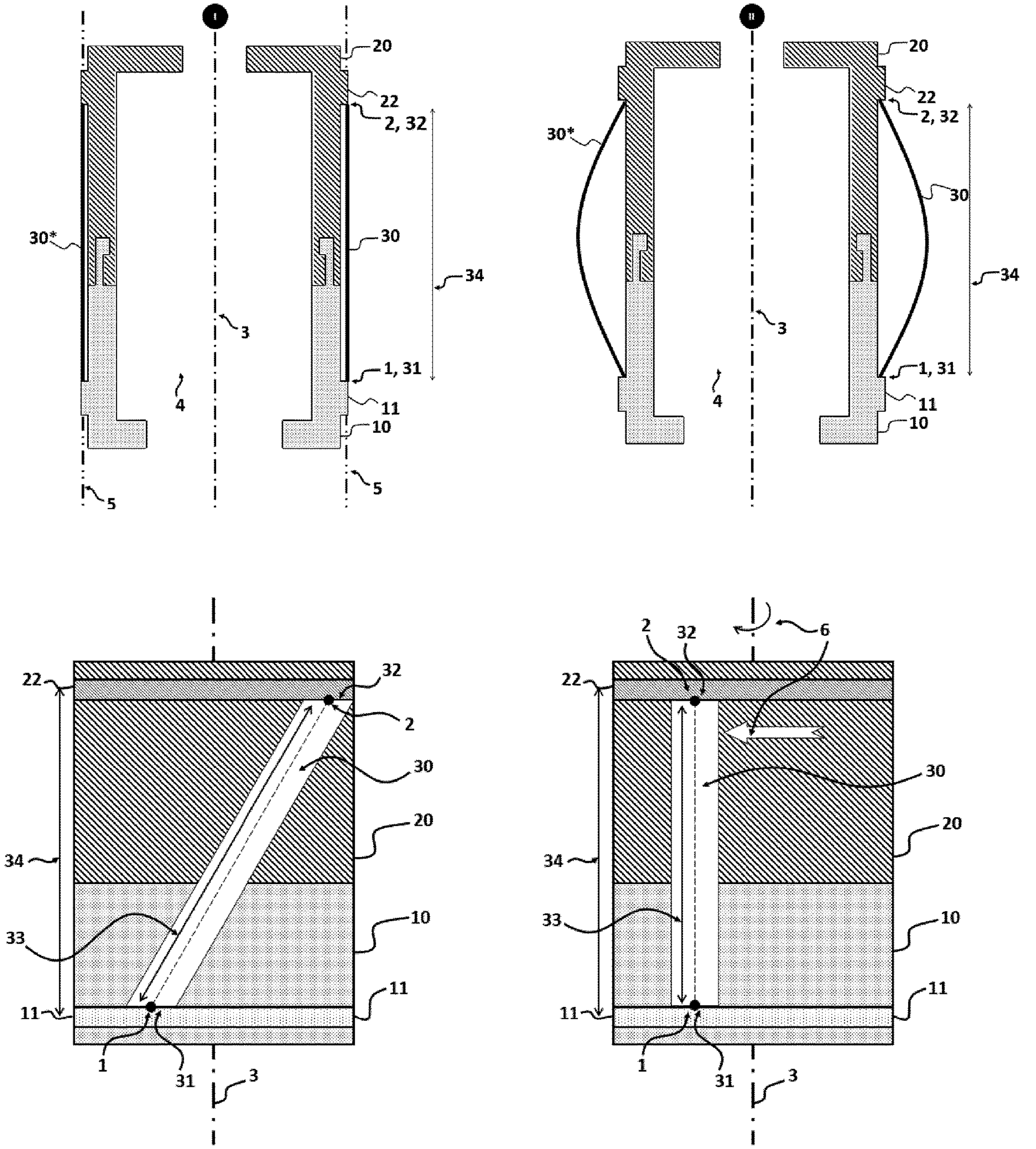
FIG. 1 depicts schematically an embodiment of a module according to the invention.

FIG. 1 depicts schematically, by non-limiting example, a module 100 according to the invention. The module 100 is configured to be installed in a recess (not depicted). The module 100 is also configured to hold a lighting unit (not depicted). Hence, the module 100 is arranged for installation of a lighting unit in a recess. Here, the module 100 is depicted in a front-view and a cross-sectional side-view at a first moment in time I, and similarly at a second moment in time II in order to illustrate the operation of said module 100.

The module 100 comprises a first body 10. The module 100 comprises a second body 20. Both bodies 10, 20 are solid parts. The first body 10 and/or the second body 20 is configured to hold said lighting unit (not depicted). Here, the first body 10 and the second body 20 are both cylindrical parts, and both comprise a hollow interior space, namely a same hollow interior space 4. In other words, the first body 10 and the second body 20 enclose a same (e.g. continuous) hollow interior space 4. The hollow interior space 4 is arranged for holding a lighting unit (not depicted). Hence, in the present example, a lighting unit (not depicted) may be mounted within said hollow interior space 4. An assembly of said module 100 and said lighting unit may be considered a lighting device, such as a downlight or spotlight.

Alternatively, in other examples, only the first body may comprise said hollow space, which hollow space is arranged for holding a lighting unit. Thereby, the second body may optionally comprise a power supply means and/or a connector for powering the lighting unit held in the hollow space; and/or the second body may optionally comprise a heat sink for conducting heat from the lighting unit held in the hollow space; and/or the second body may optionally comprise a controller for conveying control signals to said lighting unit held in the hollow space.

Yet alternatively, in other examples, only the second body may comprise said hollow space, which hollow space is arranged for holding a lighting unit. The first body may thereby be an optical element for controlling the light emitted by the lighting unit in operation. The first body may therefore comprise, for example, a lens, a diffuser, a louvre, a mixing rod, or a light guide. The first body may thus be transparent, opaque, or least partially be transparent.

Yet alternatively, in other examples, the first body and/or the second body may comprise the lighting unit. For example, the first body and/or the second body may comprise a respective inner surface area, said inner surface area facing the hollow interior space, wherein at least one LED lighting unit is configured to be on the respective inner surface area. The LED lighting unit may thereby, in operation, emit light in the hollow interior space, which may serve as a mixing chamber. Yet alternatively, said hollow internal space may be configured to receive a lightguide, thereby, after reception of the lightguide, the lightguide filling the hollow internal space, so as to couple the light out at an outcoupling area of the lightguide.

As mentioned, the first body 10 and the second body 20 are both cylindrical. The first body 10 and the second body 20 of the module may for example comprise a diameter of at least fifty millimeter. Such a diameter may be common for downlights to be installed in a recess. Alternatively, the first body and/or the second body may be tubular parts, but wherein the cross section is not circular, but e.g. elliptical, triangular, square, or polygonal.

Referring to FIG. 1, the first body 10 and the second body 20 are connected to each other with a structural relationship. More specifically, the first body 10 and the second body 20 are rotatable relative to each other around a rotation axis 3. Moreover, the first body 10 and the second body 20 are positionally fixed relative to each other in the axial direction of said rotation axis 3. Hence, the first body 10 and the second body 20 have, in an initial mode of operation, only one degree of freedom relative to each other, which is the rotation relative to each other around the rotation axis 3.

Said connection, with the structural relationship as defined above, may be envisioned in various configurations known to a person skilled in the art. Here, in the present embodiment, said configuration is depicted and enabled with a simple hooked connection between the first body 10 and the second body 20, which hooked connection enables the first body 10 and the second body 20 to rotate relative to each other around said rotation axis 3, but positionally fixes the first body 10 and the second body 20 relative to each other in the axial direction of said rotation axis 3 (i.e. the first body and second body cannot move relative to each other in said axial direction). Other configurations of the first body and the second body, which meet said structural relationships as defined above, may be envisioned similarly.

Still referring to FIG. 1: Said first body 10 comprises a first collar 11. Here, the first collar 11 is a ring shaped protrusion protruding from the first body 10, at the exterior surface of said first body, i.e. a surface facing away from the rotational axis. Furthermore: Said second body 20 comprises a second collar 22. Here, the second collar 22 is a ring shaped protrusion protruding from the second body 20, at the exterior surface of said first body, i.e. a surface facing away from the rotational axis. Alternatively, said first collar and said second collar may be any circumferential surface area or surface element of the first body and second body, respectively.

The module 100 further comprises at least one flexible strut 30. The at least one flexible strut 30 is an elongated structural element. Here, the at least one flexible strut 30 of the module 100 comprises two flexible struts. The first flexible strut is also referred to with reference 30. For convenience, the second flexible strut is not separately referred to with a reference number, and all features attributed to the first flexible strut apply mutatis mutandis to said second flexible strut. Alternatively, the at least one flexible strut may comprise three flexible struts, four flexible struts, at least five flexible struts, or at most twenty flexible struts.

As mentioned, the at least one flexible strut 30 is an elongated structural element. Therefore, the at least one strut 30 may comprise an elongated central axis (not explicitly depicted). Still referring to FIG. 1: The at least one flexible strut 30 comprises a respective first end 31 and, opposite thereto, a respective second end 32. The elongated central axis may be spanned between said first end 31 and said second end 32. Thereby, for each flexible strut of the at least one flexible strut 30, the respective first end 31 is fixed to a respective first connection point 1 on the first collar 11 of the first body 10, and the respective second end 32 is fixed to a respective second connection point 2 on the second collar 22 of the second body 20.

Hence, the first collar 11 is configured to fixate the respective first end 31 of the at least one flexible strut 30, and the second collar 22 is configured to fixate the respective second end 32 of the at least one flexible strut 30.

Hence, a function of the first collar and the second collar is to fixate the at least one strut at its first end and second end, respectively. As mentioned, the first collar 11 and the second collar 22 are embodied as a ring shaped protrusion. However, other form factors for the first collar and the second collar may be envisioned similarly, in alternative examples, as long as they are configured to fixate the respective ends of the at least one flexible strut. For example, said first collar and/or said second collar may be a surface area of respectively the first body and/or the second body, to which an end of the flexible strut may be connected/fixated.

Still referring to FIG. 1, the at least one flexible comprises a strut length 33. The strut length may be defined as the length between the respective first end 31 and the respective second end 32 of the respective strut of the at least one strut 30. Phrased differently, each strut of the at least one strut comprises a (same) strut length 33. According to the present invention, said strut length 33 is at least a factor 1.2 (one-point-two) longer than the shortest distance between the respective first connection point 1 and the second collar 22.

In the present embodiment, as depicted, said strut length is a factor 1.2 longer than the shortest distance between the respective first connection point 1 and the second collar 22. However, according to the invention, in alternative embodiments, said strut length may at least be a factor 1.2 longer than the shortest distance between the respective first connection point and the second collar, such as a factor of 1.3, 1.4, 1.5, 1.6, 2, 3, etc. Yet alternatively, said factor may at most be 10.

As a consequence of this, the at least one flexible strut 30 will substantially lie in a circumferential plane (schematically depicted in FIG. 1 with reference 5) spanned between the first collar 11 and the second collar 22, when the distance between the first connection point 1 and the second connection point 2 equals the strut length 33 of the at least one flexible strut 30. This situation is depicted in FIG. 1 at the first moment in time referred to with reference I.

However, when a rotation 6 of the first body 10 and the second body 20 relative to each other reduces the (shortest) distance between said first connection point 1 and said second connection point 2, while the strut length 33 of the at least one flexible strut 30 remains substantially equal and constant, the at least one flexible strut 30 will deform in a direction away from the rotational axis 3. This (deformed) situation is depicted in FIG. 1 at the moment in time referred to with reference II. Hence, the at least one flexible strut 30 deforms in a radial direction outwards.

Moreover, when said distance between said first connection point 1 and said second connection point 2 is at a minimum, i.e. when said distance equals the shortest distance between the first connection point 1 and the second collar 22, a maximum deformation of the at least one strut 30 will occur in the radial direction outwards. This is depicted in situation II in FIG. 1. Said minimum is achieved and alternatively indicated, for example, when a virtual line through the first point 1 and the second point 2 is parallel to the rotation axis 3.

Hence, because the rotation 6 reducing the distance between the first connection point 1 and the second connection point 2 causes the at least one strut 30 to deform in a direction away from the rotation axis 3, the at least one strut 30 will (at least partially) abut, when deformed, a surface of a recess (not depicted) into which the module 100 and the associated lighting unit (not depicted) is to be installed. Thereby, the at least one strut 30 may exert a force to a surface of the recess, which holds the module 100 fixed in said recess. Thereby, it is noted that the lighting unit may for example be mounted into the module 100 before or after installation of the module 100 in the recess. Alternatively, the module 100 may comprise the lighting unit already, for example embedded in the first body 10 and/or the second body 20.

All in all, because the first body 10 and/or the second body 20 is configured to hold said lighting unit (not depicted), the module 100 according to the invention advantageously enables the installation of a lighting unit in a recess, by easily rotating 6 the first body 10 and the second body 20 relative to each other when the module 100 is positioned at least partly in the recess, and without the use of any cumbersome and unergonomic spring clips.

Still referring to FIG. 1: The at least one flexible strut 30 comprises a strut material. Here, the strut material is a metal. Consequently, in the preset embodiment, the at least one flexible strut 30 is configured to plastically deform in a direction away from the rotational axis 3 when said rotation 6 of the first body 10 and the second body 20 relative to each other reduces the distance between said first connection point 1 and said second connection point 2. Said plastic deformation may enable that the at least one flexible strut 30 may maintain its deformed shape, e.g. due to strain hardening, thereby holding the module 100 in place when installed in the recess.

Optionally, the at least one flexible strut comprises a strut surface, wherein the strut surface comprises a patterned texture. Said patterned texture may increase the roughness of the strut surface, such that the at least one flexible strut, when deformed, (at least partially) abuts the a surface of a recess into which a lighting unit is to be installed via said module with more friction.

In a different embodiment, the same module 100 as depicted in FIG. 1 is provided, but wherein the at least one flexible strut comprises a different strut material and is configured to elastically deform. In this embodiment, the strut material is Thermoplastic Polyurethane (TPU). Alternatively, other polymer materials may be selected as the strut material.

The at least one flexible strut also comprises a strut width (not explicitly referenced). Here, said strut width is a sixth of the strut length. Alternatively, said strut width may be at most a fifth of said strut length. Said strut width is thereby be defined in a direction perpendicular to the elongated central axis as mentioned before, and substantially in a tangential direction relative to the rotation axis. Moreover: The at least one flexible strut also comprises a strut thickness (not explicitly referenced). Here, said strut thickness is a fifth of the strut width. Alternatively, said strut width may be at most equal to the strut width, preferably at most a fifth of the strut width. Said strut thickness is thereby defined in a direction perpendicular to the elongated central axis as mentioned before, and in a radial direction relative to the rotation axis. In the present embodiment, with the strut material being TPU, merely as one non-limiting example, the strut length×width×thickness equals 90×15×3 millimeter. Other measures may be envisioned similarly.

Optionally, the at least one flexible strut comprises a strut surface, wherein the strut surface comprises a patterned texture. Said patterned texture may increase the roughness of the strut surface, such that the at least one strut, when deformed, (at least partially) abuts the a surface of a recess into which a lighting unit is to be installed with more friction. Hence, in this embodiment, the at least one flexible strut is configured to elastically deform. More specifically, the at least one flexible strut is configured to elastically deform in a direction away from the rotational axis when a rotation of the first body and the second body relative to each other reduces the distance between said first connection point and said second connection point.

Figure 2:
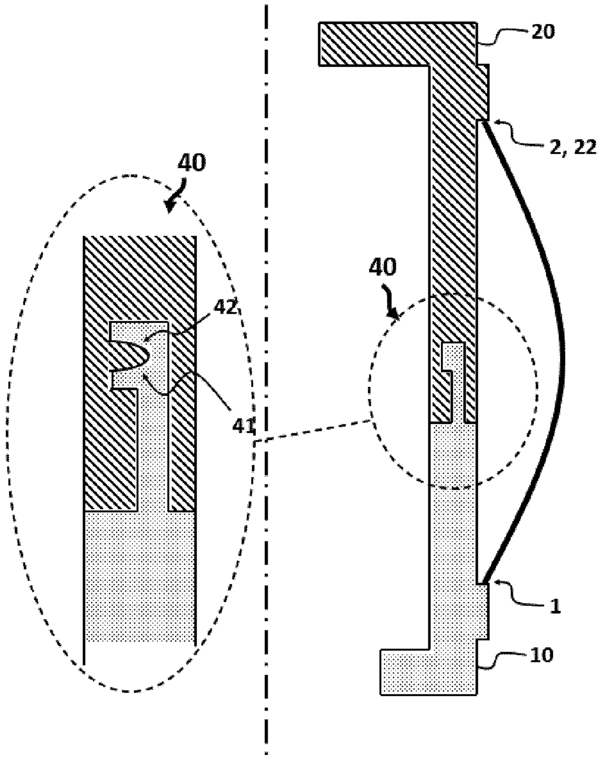
FIG. 2 depicts schematically a locking mechanism according to the invention.

Furthermore, in this embodiment, the module comprises a locking mechanism. FIG. 2 depicts schematically, by non-limiting example, an example of said locking mechanism. Referring to FIG. 1 and FIG. 2, the locking mechanism 40 is configured to releasably fixate, in a locked mode of operation, the rotation of the second body 20 relative to the first body 10: for example when the distance between said first connection point 1 and said second connection point 2 equals the distance between the respective first connection point 1 and the second collar 22. Thereby, said locked mode of operation corresponds to the second moment in time as depicted in FIG. 1. Consequently, the rotation of the second body relative to the first body is releasably fixated, when the at least one strut is substantially at a maximum deformation in radial direction outwards. This ensures that the locked mode of operation may occur when the at least one strut most optimally abuts, and exerts a force, on a surface of the recess.

All in all: Since the locking mechanism releasably fixates the rotation of the second body relative to the first body, the locking prevents the second body to rotate separately from to the first body, or vice versa, in said locked mode of operation. This renders that the distance between said first connection point and said second connection point also remains releasably fixated in said locked mode of operation, which keeps the deformation of the at least one flexible strut fixed, and thereby keeps the module fixated in the recess, when installed.

Even further, since the locking mechanism is configured to releasably fixate, in the locked mode of operation, the rotation of the second body relative to the first body, the locking mechanism is also able to release the module back into the initial mode of operation, in which the first body and the second body are rotatable relative to each other around the rotation axis. This advantageously allows the module to be removed from the recess as well, e.g. for purposes of maintenance or replacement, without requiring any force to pull out or affecting the recess itself.

Still referring to FIG. 2, the locking mechanism 40 comprises a slot 41 on the first body 10 and a protrusion 42 on the second body 20. Hence, when the protrusion 42 aligns with, and snaps into, the slot 41, the second body 20 is releasably locked to the first body 10.

Alternatively, the locking mechanism may comprise a first magnet on the first body and a second magnet on the second body, wherein the second body is releasably locked to the first body when the first magnet aligns with the second magnet. Yet alternatively, other locking mechanisms may be envisioned, as known to the skilled person, e.g. to interlock two solid bodies.

As mentioned, in this embodiment, the at least one flexible strut is configured to elastically deform. Said elastic deformation allows, in combination with releasing said locking means 40 from the locked mode of operation, that the at least one flexible strut deforms back into a previous shape, or fall back into the initial mode of operation (as indicated as the first moment of time I in FIG. 1) when a rotation of the first body and the second body relative to each other increases the distance between said first connection point and said second connection point. Hence, the elastic deformation enables to easily re-use the module, more specifically to mount and demount said module in a recess.

Figure 3:
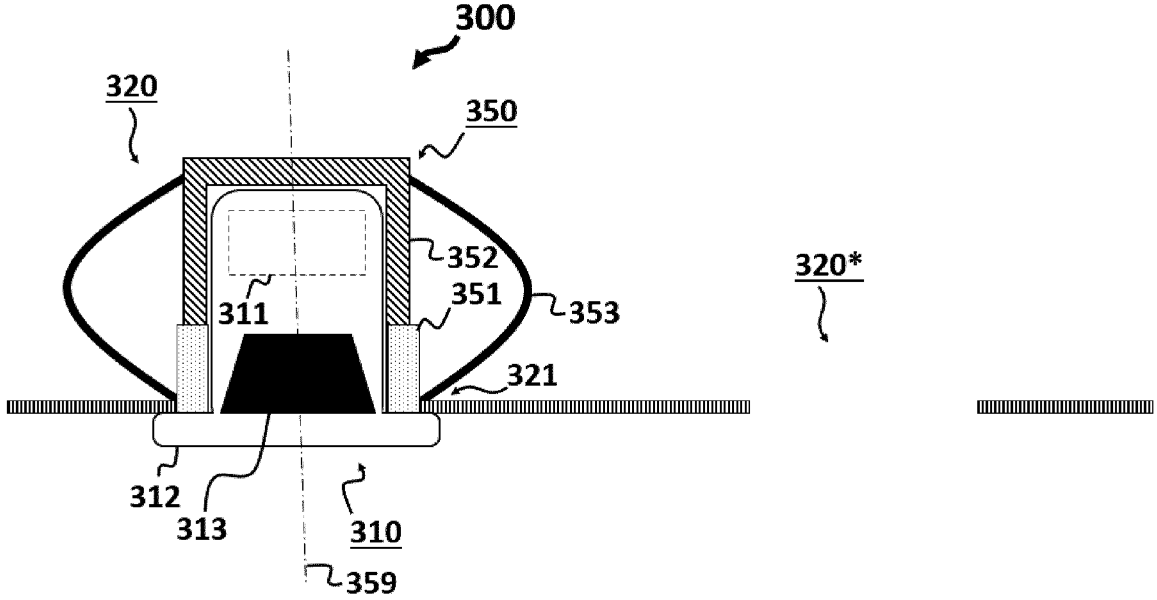
FIG. 3 depicts schematically a lighting device according to the invention.

FIG. 3 depicts schematically, by non-limiting example, a lighting device 300 according to the invention. The lighting device 300 comprises a module 350 according to the invention. The module 350 is configured to be fixated in a recess 320. An empty recess 320* is also depicted in FIG. 3 to serve as illustrative reference. The module 350 comprises a first body 351, a second body 352, and at least one flexible strut 353 according to the invention, and as described above. The lighting device 300 further comprises a lighting unit 310. Here, the first body 351 and the second body 352 are configured to hold said lighting unit 310.

As mentioned, considering the module according to the invention, the first body 351 and the second body 352 are rotatable relative to each other around a rotation axis 359, and are positionally fixed relative to each other in the axial direction of said rotation axis 359. The first body 351 comprises a first collar, which is a respective surface on the first body 351 to which a first end of the respective at least one flexible strut 353 is fixated. The second body 352 comprises a second collar, which is a respective surface on the second body 351 to which a second end of the respective at least one flexible strut 353 is fixated. Hence, each flexible strut of the at least one flexible strut 353 comprises a respective first end and a respective second end. The module 350) may e.g. comprise at least two flexible struts 353. FIG. 3 depicts two flexible struts 353 of the module 350. Said first end is fixed to a respective first connection point on the first collar and said second end is fixed to a respective second connection point on the second collar. Here, the at least one flexible strut 353 comprises a strut length, wherein the strut length is a factor 1.6 longer than the shortest distance between the respective first connection point and the second collar. Alternatively, said factor may be at least 1.2.

Consequently, the module 350 is configured to be fixated in the recess 320. Namely, the module 350 is fixated in the recess 320 when, in operation, a rotation of the first body 351 and the second body 352 relative to each other reduces the distance between said first connection point and said second connection point and causes the at least one flexible strut 353 to deform in a direction away from the rotational axis 359. Hence, when deformed, the at least one flexible strut 353 abuts a surface 321 of said recess 320.

Here, the at least one flexible strut 353 further comprises a strut surface. The strut surface comprises, albeit optionally, a patterned texture. The patterned texture is at least present at the surface area of the strut surface that is facing the recess 320. Said patterned texture may increase the roughness of the strut surface, such that the at least one flexible strut 353, when deformed, abuts said surface 321 of the recess 320, into which a lighting unit 310 is to be installed via said module 350, with more friction. Said strut surface may alternatively comprise an array of protrusions, for similarly improving the fixation of the module in the recess.

Still referring to FIG. 3, the lighting unit 310 is configured to be mounted to the first body 351 and/or the second body 352 of the module 350. Therefore, in examples, the module 350 comprises mounting means for mounting the lighting unit 310. Such mounting means may be known to a person skilled in the art, such as mechanical fasteners, adhesive mounting means, magnetic mounting means, snap-fit connectors, tight-fitting the lighting unit in the module, etc.

Hence, the lighting unit 310 is mounted to the module, and thereby installed in the recess 230. Here, the lighting unit 310 is a downlight. The lighting unit 310 comprises a light source 313. The light source 313 is a semiconductor light source, or may alternatively be a conventional light source or e.g. a laser light source. Even further, as optional features, the lighting unit 310 comprises a power supply unit 311 and a trim 312. In further examples, said power supply unit 311 may be connected to a main power supply, such as e.g. a power cable or a power socket, with a power connection means. Said power connection means may at least partially be comprised by the first body and/or the second body, so as to convey power to the lighting unit. Hence, according to the invention, the lighting unit 310 and the module 350 may be electrically connected.

Yet in further examples, the second body may be accessible through the first body. For example, the first body, or e.g. the trim of the first body, may comprise an aperture for accessing the second body. The second body may e.g. comprise a protrusion, or body part, that protrudes or is accessible through the first body.

As a result, the invention advantageously enables the installation of a lighting unit in a recess, by easily rotating the first body and the second body relative to each other when the module is positioned at least partly in the recess, and without e.g. the use of any cumbersome and unergonomic spring clips.

Figure 4:
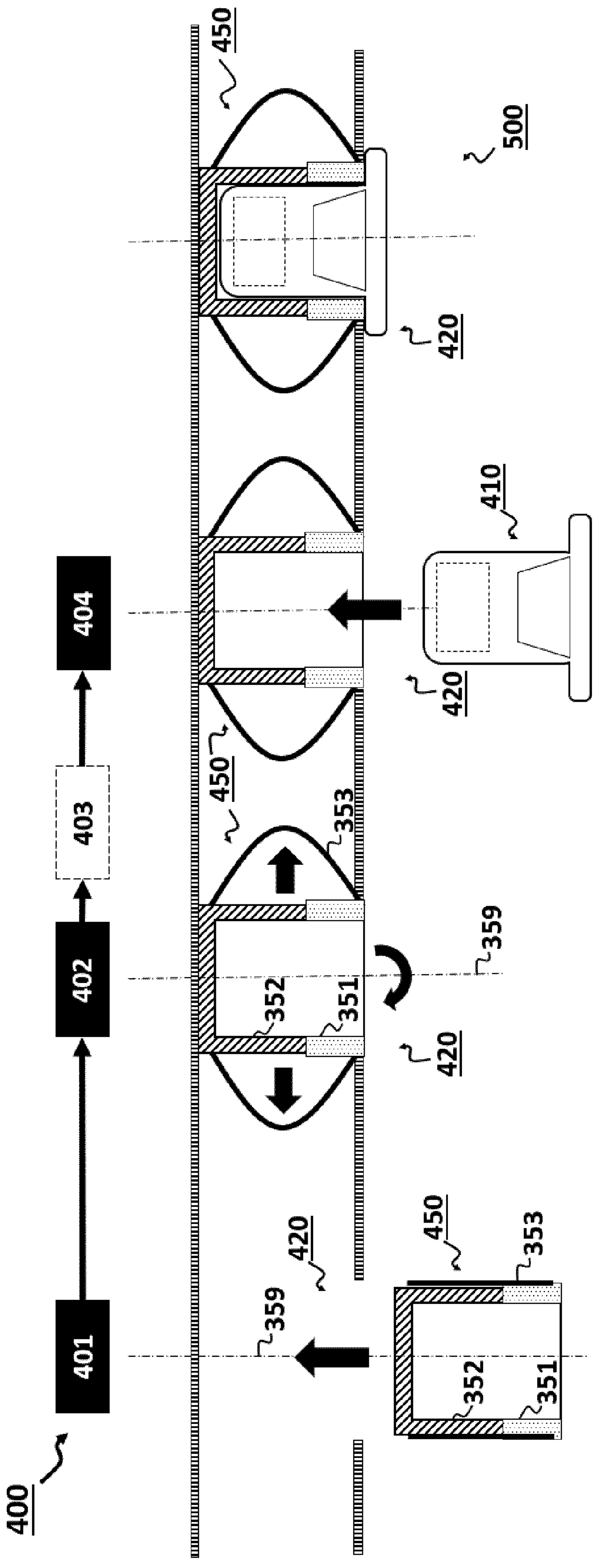
FIG. 4 depicts schematically a method according to the invention.

FIG. 4 depicts schematically, by non-limiting example, a method 400 of installing a lighting unit 410 in a recess 420 according to the invention. The method 400 is performed at least by a module 450 according to the invention.

As mentioned, considering the module according to the invention, referring to FIG. 4, the first body 451 and the second body 452 are rotatable relative to each other around a rotation axis 459, and are positionally fixed relative to each other in the axial direction of said rotation axis 459. The first body 451 comprises a first collar, which is a respective surface on the first body 451 to which a first end of the respective at least one flexible strut 453 is fixated. The second body 452 comprises a second collar, which is a respective surface on the second body 451 to which a second end of the respective at least one flexible strut 453 is fixated. Hence, each flexible strut of the at least one flexible strut 453 comprises a respective first end and a respective second end. Said first end is fixed to a respective first connection point on the first collar and said second end is fixed to a respective second connection point on the second collar. Here, the at least one flexible strut 453 comprises a strut length, wherein the strut length is a factor 1.5 longer than the shortest distance between the respective first connection point and the second collar. Alternatively, said factor may be at least 1.2.

Still referring to FIG. 4, the method 400 comprises a step 401 of positioning the module 450 in the recess 420. The method 400 comprises a step 402 of deforming at least one flexible strut 453 of the module 450 in a direction away from the rotational axis 459 upon rotating the first body 451 and the second body 452 relative to each other to reduce the distance between said first connection point and said second connection point; and the at least one flexible strut, when deformed, abutting a surface of said recess 420 for holding the module 450 in the recess 420.

The method comprises the step 404 of mounting the lighting unit 410 to the first body and/or the second body. Hence, the first body 451 and/or the second body 452 is configured to hold said lighting unit 410. This results in the module 450 and the lighting unit 410 being installed in the recess 420, thereby rendering a recessed lighting device 500, as depicted in FIG. 4.

Moreover, referring to the embodiment depicted in FIG. 4, the module also optionally comprises a locking mechanism. This locking mechanism is thus not necessary for all examples, especially not for examples wherein the at least one strut is plastically deforming. Therefore, the method may further comprise an optional step 403 of releasably fixating, in a locked mode of operation, with the locking mechanism, the rotation of the second body 452 relative to the first body 451.

The invention claimed is:

1. A module for installation of a lighting unit in a recess, wherein the module comprises:

a first body comprising a first collar;

a second body comprising a second collar;

at least one flexible strut;

wherein the first body and/or the second body is configured to hold said lighting unit;

wherein the first body and the second body are rotatable relative to each other around a rotation axis, and are positionally fixed relative to each other in the axial direction of said rotation axis;

wherein the at least one flexible strut comprises a respective first end and a respective second end, wherein said first end is fixed to a respective first connection point on the first collar and said second end is fixed to a respective second connection point on the second collar;

wherein the at least one flexible strut comprises a strut length, wherein the strut length is at least a factor 1.2 longer than the shortest distance between the respective first connection point and the second collar;

wherein the at least one flexible strut is configured to deform in a direction away from the rotational axis when a rotation of the first body and the second body relative to each other reduces the distance between said first connection point and said second connection point.

2. The module according to claim 1, wherein the module comprises a locking mechanism configured to releasably fixate, in a locked mode of operation, the rotation of the second body relative to the first body.

3. The module according to claim 2, wherein said locking mechanism is configured to releasably fixate, in said locked mode of operation, the rotation of the second body relative to the first body when the distance between said first connection point and said second connection point equals the distance between the respective first connection point and the second collar.

4. The module according to claim 1, wherein the at least one flexible strut is configured to elastically deform in a direction away from the rotational axis when a rotation of the first body and the second body relative to each other reduces the distance between said first connection point and said second connection point.

5. The module according to claim 1, wherein the at least one flexible strut is configured to plastically deform in a direction away from the rotational axis when a rotation of the first body and the second body relative to each other reduces the distance between said first connection point and said second connection point.

6. The module according to claim 1, wherein the at least one flexible strut comprises a strut material, wherein the strut material comprises at least one of: a metal, a polymer, a composite fiber, a natural material.

7. The module according to claim 1, wherein the at least one flexible strut comprises a strut width, wherein the strut width is at most a fifth of the strut length.

8. The module according to claim 1, wherein the first body and/or the second body comprises a hollow interior space arranged for holding said lighting unit.

9. The module according to claim 1, wherein the at least one flexible strut comprises a strut surface, wherein the strut surface comprises a patterned texture.

10. The module according to claim 1, wherein the first collar and/or the second collar is circular, wherein the first collar and/or the second collar is circular comprises a diameter of at least 50 millimeter.

11. The module according to claim 1, wherein the at least one flexible strut comprises a first strut and a second strut;

wherein the first connection point associated with the first strut and the first connection point associated with the second strut are arranged antipodal to each other on the first collar;

wherein the second connection point associated with the first strut and the second connection point associated with the second strut are arranged antipodal to each other on the second collar.

12. The module according to claim 1, wherein the at least one flexible strut comprises at least three flexible struts.

13. A lighting device comprising a lighting unit and the module according to claim 1;

wherein the module is configured to be fixated in a recess when, in operation, a rotation of the first body and the second body relative to each other reduces the distance between said first connection point and said second connection point and causes the at least one flexible strut to deform in a direction away from the rotational axis;

wherein the at least one flexible strut, when deformed, abuts a surface of said recess;

wherein the lighting unit is configured to be mounted to the first body and/or to the second body of the module.

14. A lighting device according to claim 11, wherein the first body and/or the second body of the module comprises the lighting unit.

15. A method of installing a lighting unit in a recess, the method being performed by the module according to claim 1, wherein the method comprises:

positioning the module in the recess;

deform the at least one flexible strut of the module in a direction away from the rotational axis upon rotating the first body and the second body relative to each other to reduce the distance between said first connection point and said second connection point;

wherein the module comprises a locking mechanism;

wherein the method comprises:

releasably fixate, in a locked mode of operation, with the locking mechanism, the rotation of the second body relative to the first body;

wherein the at least one flexible strut, when deformed, abuts a surface of said recess for holding the module in the recess;

wherein the first body and/or the second body is configured to hold said lighting unit.

* * * * *